United States Patent
Maes (10) Patent No.: US 7,860,851 B2
(45) Date of Patent: Dec. 28, 2010

(54) TIERED PROCESSING FOR XDM AND OTHER XML DATABASES

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 387 days.

(21) Appl. No.: 12/022,450

(22) Filed: Jan. 30, 2008

(65) Prior Publication Data

US 2009/0193031 A1    Jul. 30, 2009

(51) Int. Cl.
*G06F 17/30* (2006.01)
(52) U.S. Cl. ..................................................... 707/705
(58) Field of Classification Search ............ 707/2, 707/101, 705; 709/226
See application file for complete search history.

(56) References Cited

U.S. PATENT DOCUMENTS

2006/0212350 A1* 9/2006 Ellis et al. ................. 705/14
2006/0230098 A1* 10/2006 Shen et al. ................. 709/201
2006/0277307 A1* 12/2006 Bernardin et al. ........... 709/226
2006/0282447 A1* 12/2006 Hollebeek ................... 707/101

* cited by examiner

*Primary Examiner*—Etienne P LeRoux
(74) *Attorney, Agent, or Firm*—Townsend and Townsend and Crew, LLP (57) ABSTRACT

Embodiments of the invention provide systems and methods for processing of XDM operation to access XML documents in a database or other repository. According to one embodiment, a system for processing requests for information in a data repository can comprise a first tier adapted to receive an eXtensible Markup Language (XML) Configuration Access Protocol (XCAP) request from a client, pre-process the request, and forward the XCAP request based on the pre-processing. A second tier can be communicatively coupled with the first tier. The second tier can be adapted to receive the XCAP request from the first tier, translate the XCAP request to a database request, and forward the database request. A third tier can be communicatively coupled with the second tier. The third tier can be adapted to receive the database request from the second tier and service the database request.

43 Claims, 5 Drawing Sheets

TIERED PROCESSING FOR XDM AND OTHER XML DATABASES

BACKGROUND OF THE INVENTION

Embodiments of the present invention relate generally to methods and systems for managing information in a database and more particularly to tiered processing of requests for information in a database.

EXtensible Markup Language (XML) documents are used to define information in a generic manner that can be read or otherwise utilized by different applications, systems, environments, etc. The Internet Engineering Task Force (IETF) has defined XML Configuration Access Protocol (XCAP) as a specification that allows a client to read, write and modify application data, such as configuration data, stored in XML format on a server. Generally speaking, XCAP maps XML document sub-trees and element attributes to HyperText Transfer Protocol (HTTP) Uniform Resource Identifiers (URIs), so that these components can be directly accessed by HTTP. XML Document Management (XDM) is an Open Mobile Alliance (OMA) specification for accessing and manipulating XML documents stored in networked document repositories. The XDM specification is based on XCAP and enables manipulation of individual XML elements and attributes instead of the whole XML document. This reduces the amount of bandwidth used to receive and respond to requests to access information in the XML documents. XDM enablers are provided as part of the OMA Session Initiation Protocol (SIP) SIP Instant Messaging Presence Leveraging Extensions (SIMPLE) presence enabler and other OMA enablers as described in the Open Mobile Alliance specifications.

However, processing of XDM operations involve complete parsing of each document to apply the request. That is, upon receiving an XCAP request, an XDM server parses each XML document of a repository to search for a string identified in the XCAP request. As a result, XDM operations do not to scale very well. In other words, as the size of the repository grows and/or the number of requests increases, the processing load on the XDM server grows significantly. Hence, there is a need for improved methods and systems for processing of XDM operation to access XML documents in a database or other repository.

BRIEF SUMMARY OF THE INVENTION

Embodiments of the invention provide systems and methods for processing of XDM operation to access XML documents in a database or other repositories. According to one embodiment, a system for processing requests for information in a data repository can comprise a first tier adapted to receive an eXtensible Markup Language (XML) Configuration Access Protocol (XCAP) request from a client, pre-process the request, and forward the XCAP request based on the pre-processing. A second tier can be communicatively coupled with the first tier. The second tier can be adapted to receive the XCAP request from the first tier, translate the XCAP request to a database request, and forward the database request. A third tier can be communicatively coupled with the second tier. The third tier can be adapted to receive the database request from the second tier and service the database request.

In one implementation, the second tier can comprise a plurality of XML Document Management (XDM) servers. For example, the plurality of XDM servers comprises a plurality of web servers. The plurality of web servers may further comprise a plurality of clustered application servers such as a JGROUP or Tangosol Coherence data grid to provide a distributed cache and/or grid computing session replication. In such cases, pre-processing can comprise performing load balancing between the XDM servers and forwarding the XCAP request based on the pre-processing can comprise forwarding the XCAP request to one of the XDM servers based on the load balancing. The load balancing can be based on a current load of each of the plurality of XDM servers, a current availability of each of the plurality of XDM servers, etc. Additionally or alternatively, pre-processing the XCAP request can comprise partitioning the XCAP request between two or more of the XDM servers. Partitioning the XCAP request can be based at least in part on an identity of a user associated with the XCAP request a location of a user associated with the XCAP request, and/or other factors.

The third tier can comprise a database management system. Furthermore, the database request can comprise an SQL query. In such cases, the third tier can service the database request by running the SQL query on the database. In some cases, the database management system can be adapted to perform local caching. Additionally or alternatively, the database management system can be adapted to provide local persistence.

According to another embodiment, a method of processing requests for information in a data repository can comprise receiving an eXtensible Markup Language (XML) Configuration Access Protocol (XCAP) request from a client, translating the XCAP request to a database request, and accessing the information in the data repository based on the database request. The data repository can comprise a database management system and the database request can comprise an SQL query. In such cases, accessing the information in the data repository based on the database request comprises running the SQL query on the database.

In some cases, the XCAP request can be pre-processed prior to translating the XCAP request to a database request. For example, pre-processing the XCAP request can comprise performing load balancing between a plurality of XDM servers. In such cases, forwarding the XCAP request based on the pre-processing comprises forwarding the XCAP request to one of the XDM servers based on the load balancing. Load balancing can be based on a current load of each of the plurality of XDM servers, a current availability of each of the plurality of XDM servers, etc. Additionally or alternatively, pre-processing the XCAP request can comprise partitioning the XCAP request between two or more of a plurality of XDM servers. For example, partitioning the XCAP request can be based at least in part on an identity of a user associated with the XCAP request, a location of a user associated with the XCAP request, or other criteria.

According to yet another embodiment, a machine-readable medium can have stored thereon a series of instructions which, when executed by the processor, cause the processor to process requests for information in a data repository by receiving an eXtensible Markup Language (XML) Configuration Access Protocol (XCAP) request from a client, translating the XCAP request to a database request, and accessing the information in the data repository based on the database request. The data repository can comprise a database management system and the database request can comprise an SQL query. In such cases, accessing the information in the data repository based on the database request comprises running the SQL query on the database.

In some cases, prior to translating the XCAP request to a database request, the XCAP request can be pre-processed. For example, pre-processing the XCAP request can comprise performing load balancing between a plurality of XDM servers. In such cases, forwarding the XCAP request based on the pre-processing can comprise forwarding the XCAP request to one of the XDM servers based on the load balancing. In another example, pre-processing the XCAP request can comprise partitioning the XCAP request between two or more of a plurality of XDM servers.

According to still another embodiment, a system for processing requests for information in a data repository can comprise a first tier adapted to receive a request from a client, pre-process the request, and forward the request based on the pre-processing. A second tier communicatively coupled with the first tier can be adapted to receive the request from the first tier, translate the request, and forward the translated request. A third tier communicatively coupled with the second tier can comprise a data repository. The third tier can be adapted to receive the translated request from the second tier and service the translated request from the data repository. For example, the request from the client can comprise but is not limited to an XCAP request. The second tier can comprise but is not limited to a plurality XDM servers. The data repository of the third tier can comprise but is not limited to a database. In such cases, the XDM servers can be adapted to translate the XCAP request to a database request such as an SQL query.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for processing requests for information in a data repository. More specifically, embodiments of the present invention provide tiered approach to handling eXtensible Markup Language (XML) Configuration Access Protocol (XCAP) requests for information maintained in a database or other repository. In this approach, one tier can comprise a back-end or database tier. This tier can include one or more database management systems and repositories. The repositories of this tier can include the information, such as XML documents, that are the subject of the requests. Generally speaking, this tier can receive, process, and respond to requests, e.g., SQL queries, for information in the repositories.

Another tier can be implemented that translates XCAP requests to database requests, such as SQL queries, appropriate to the database management systems and/or repositories of the back-end tier. As will be seen, this middleware tier can comprise a number of XML Document Management (XDM) servers. Generally speaking, these servers can be adapted to receive an XCAP request, convert it to a format and/or type of request appropriate to the back-end tier, and pass the converted request to the back-end tier. Upon execution of the converted request by the back-end tier, the middleware tier can receive a response, i.e., the requested information, convert the response to an appropriate XCAP response, and return the response to the requesting client.

Yet another tier can be implemented as a front-end to the XDM servers. This tier can be adapted to receive the XCAP requests from one or more clients and route or pass the requests to one or more of the XDM servers of the middleware tier. As noted, the middleware tier can comprise a number of XDM servers. Therefore, the front-end tier can be adapted to route requests to one or more of the XDM servers based on load balancing between the servers, partitioning between the servers, or based on other factors. Various additional details of embodiments of the present invention will be described below with reference to the figures.

Figure 1:
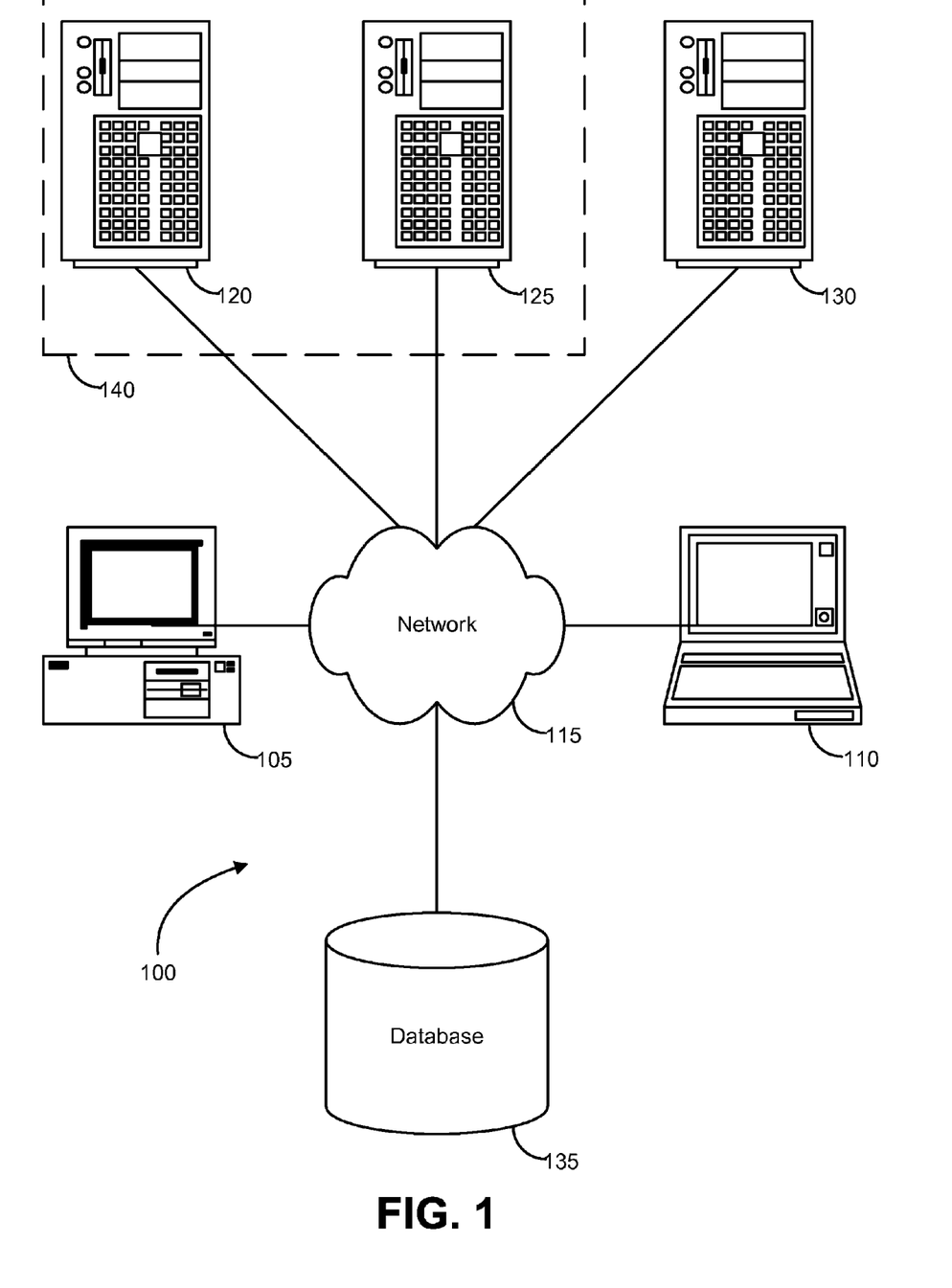
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g. the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
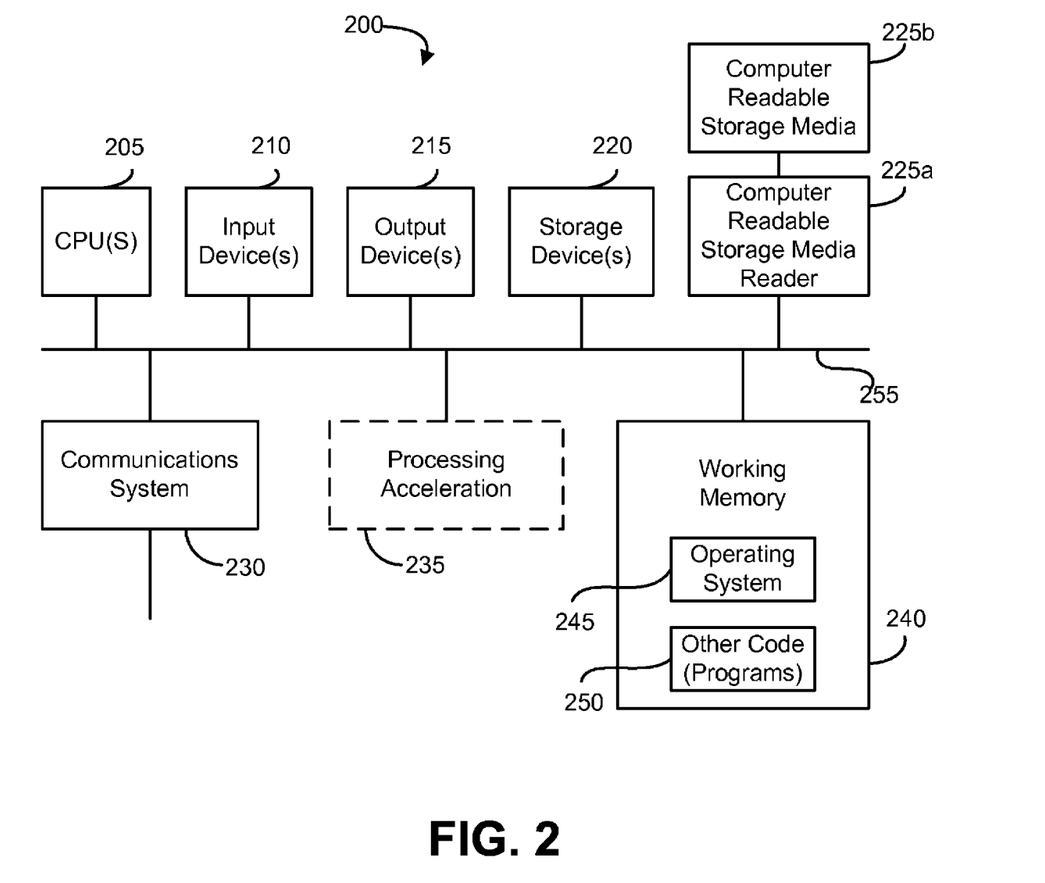
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
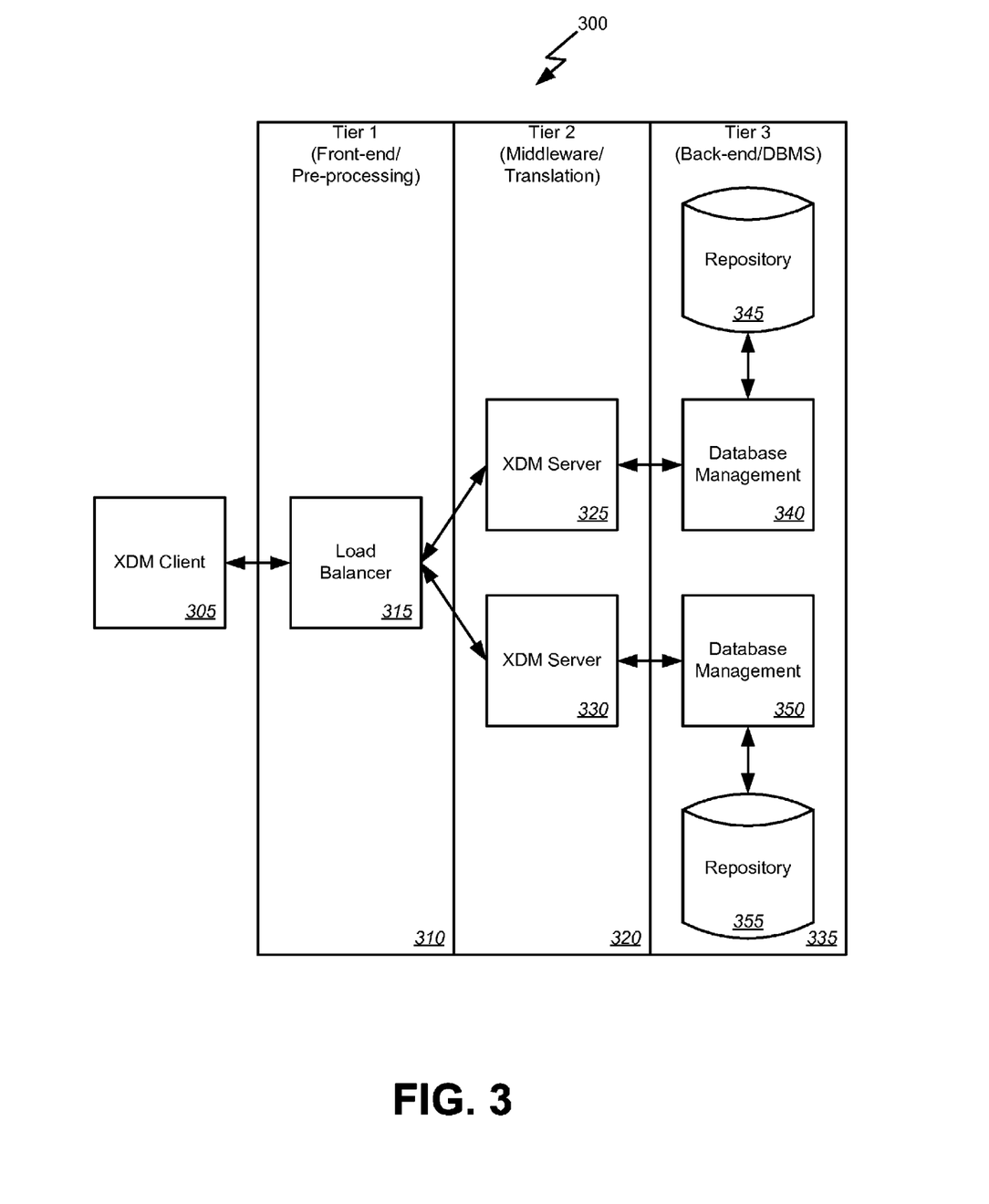
FIG. 3 is a block diagram illustrating, at a high-level, functional components of a system for processing requests for information in a data repository according to one embodiment of the present invention.

FIG. 3 is a block diagram illustrating, at a high-level, functional components of a system for processing requests for information in a data repository according to one embodiment of the present invention. As noted above, embodiments of the invention provide systems and methods for processing requests for information in a data repository. More specifically, embodiments of the present invention provide tiered approach to handling eXtensible Markup Language (XML) Configuration Access Protocol (XCAP) requests for information maintained in one or more databases or other repositories. In the example illustrated in FIG. 3, the system 300 includes three tiers 310, 320, and 335. As will be described in detail below, the first tier 310 can comprise a front-end or pre-processing tier. The second tier 320 can comprise a middleware or translation tier and can be communicatively coupled with the first tier 310 via a network (not shown here) such as the Internet or any other local area or wide area network as described above. The third tier 335 can comprise a back-end or database management tier and can be communicatively coupled with the second tier 320 via a network (not shown here) such as the Internet or any other local area or wide area network as described above.

The system 300 can also include a client 305 such as an XDM client communicatively coupled with the first tier 310 via a network (not shown here) such as the Internet or any other local area or wide area network as described above. Generally speaking, the client 305 can issue XCAP requests for information in one or more repositories 345 and 355 through the tiers 310, 320, and 335 of the system and, as will be described in detail below, can receive the requested data in response. It should be understood that, while only one client 305 is illustrated here for clarity, any number of clients may be present in various implementations.

According to one embodiment, the back-end or database tier 335 can include one or more database management systems 340 and 350 and one or more repositories 345 and 355. The repositories 345 and 355 of this tier 335 can include the information, such as XML documents, that are the subject of the requests. Generally speaking, this tier 335 can receive, process, and respond to requests, e.g., SQL queries, for information in the repositories 345 and 355 received from the client 305 via the other tiers 310 and 320 as will be described below. It should be understood that any number of database management systems 340 and 350 and/or repositories 345 and 355 can be implemented in this tier 335. For example, a database management system 340 may support multiple repositories 345. Depending upon the implementation, these database management systems 340 and 350 and/or repositories 345 and 355 can be implemented in the same system or set of systems or may be implemented in any number of different servers, locations, etc. Furthermore, it should be understood that in some implementations, the database management systems 340 and 350 and the repositories supported thereby 345 and 355 may be of the same type while in other implementations, some or all of the database management systems 340 and 350 and the repositories supported thereby 345 and 355 may be of different types. The data stored in the repositories 345 and 355 may or may not be stored as one or more XML documents. According to one embodiment, the database management systems 340 and 350 can be adapted to provide local caching of the data of the repositories 345 and 355. Additionally or alternatively, the database management systems 340 and 350 can be adapted to provide local persistence of the data of the repositories 345 and 355.

The middleware or translation tier 320 can be adapted to translate XCAP requests received from the client 305 via the front-end or preprocessing tier 310 to database requests, such as SQL queries, appropriate to the database management systems 340 and 350 and/or repositories 345 and 355 of the back-end tier 335. Generally speaking, the middleware or translation tier 320 can be adapted to receive an XCAP request via the front-end tier 310, convert it to a format and/or type of request appropriate to a database management system 340 and/or repository 345 of the back-end tier 335, and pass the converted request to the back-end tier 335. Upon execution of the converted request by the database management system 340 and/or repository 345 of the back-end tier 335, the middleware tier 320 can receive a response, i.e., the requested information, convert the response to an appropriate XCAP response, and return the response to the requesting client 305 via the front-end tier 310.

According to one embodiment, the middleware or translation tier 320 can comprise a number of XML Document Management (XDM) servers 325 and 330. It should be understood that, while two XDM servers 325 and 330 are illustrated in this example, any number of servers may be used depending upon the implementation. Furthermore, while illustrated here as having a one-to-one relationship between the XDM servers 325 and 330 of the middleware tier 320 and the database management systems 340 and 350 of the backend-tier 335, such a relationship is not required. Rather, any number of XDM servers and any number of database management systems and/or repositories can be used in a variety of different arrangements depending upon the exact implementation without departing from the scope of the present invention. Furthermore, the XDM servers 325 and 330 of the middleware tier 320 can be implemented in a number of different ways. For example, according to one embodiment the XDM servers 325 and 330 can be implemented as web servers. These web servers may further comprise clustered application servers such as a JGROUP. According to one embodiment, such a JGROUP can be implemented to provide high availability and/or data replication.

The front-end tier 310 can be adapted to receive the XCAP requests from one or more clients 305 and route or pass the requests to one or more of the XDM servers 325 and 330 of the middleware tier 320. Upon servicing of the request by the back-end tier 335, the front-end tier 310 can receive a response via the middleware tier 320 and return the response to the requesting client 305. According to one embodiment, the front-end tier 310 can include a load balancer 315 to route requests to one or more of the XDM servers 325 and 330 based on a current load of each of the servers 325 and 330, partitioning between the servers 325 and 330, or based on other factors. For example, the request can be passed to one or the XDM servers 325 or 330 based on a current load of each of the XDM servers 325 and 330, a current availability of each of the XDM servers 325 and 330, etc. Additionally or alternatively, the XCAP request can be passed to one of the XDM servers 325 or 330 based on partitioning between two or more of the XDM servers 325 and 330. For example, partitioning can be based at least in part on an identity of a user associated with the XCAP request, a location of a user associated with the XCAP request, and/or other factors.

Stated another way, a system 300 for processing requests for information in a data repository 345 can comprise a first tier 310 adapted to receive an XCAP request from a client 310, pre-process the request, and forward the XCAP request based on the pre-processing. A second tier 320 can be communicatively coupled with the first tier 310. The second tier 320 can be adapted to receive the XCAP request from the first tier 310, translate the XCAP request to a database request, and forward the database request. A third tier 335 can be communicatively coupled with the second tier 320. The third tier 335 can be adapted to receive the database request from the second tier 320 and service the database request.

In one implementation, the second tier 320 can comprise a plurality of XDM servers 325 and 330. For example, the plurality of XDM servers 325 and 330 comprises a plurality of web servers. The plurality of web servers may further comprise a plurality of clustered application servers such as a JGROUP. In such cases, pre-processing by the first tier 310 can comprise performing load balancing between the XDM servers 325 and 330 and forwarding the XCAP request by the first tier 310 based on the pre-processing can comprise forwarding the XCAP request to one of the XDM servers 325 and 330 based on the load balancing. The load balancing can be based on a current load of each of the plurality of XDM servers 325 and 330, a current availability of each of the plurality of XDM servers 325 and 330, etc. Additionally or alternatively, pre-processing the XCAP request by the first tier 310 can comprise partitioning the XCAP request between two or more of the XDM servers 325 and 330. Partitioning the XCAP request can be based at least in part on an identity of a user associated with the XCAP request, a location of a user associated with the XCAP request, and/or other factors.

The third tier 335 can comprise a database management system 340. Furthermore, the database request can comprise an SQL query. In such cases, the third tier 335 can service the database request by running the SQL query on the database 345. In some cases, the database management system 340 can be adapted to perform local caching of the information in the repository 345. Additionally or alternatively, the database management system 340 can be adapted to provide local persistence of the information in the repository 345.

Figure 4:
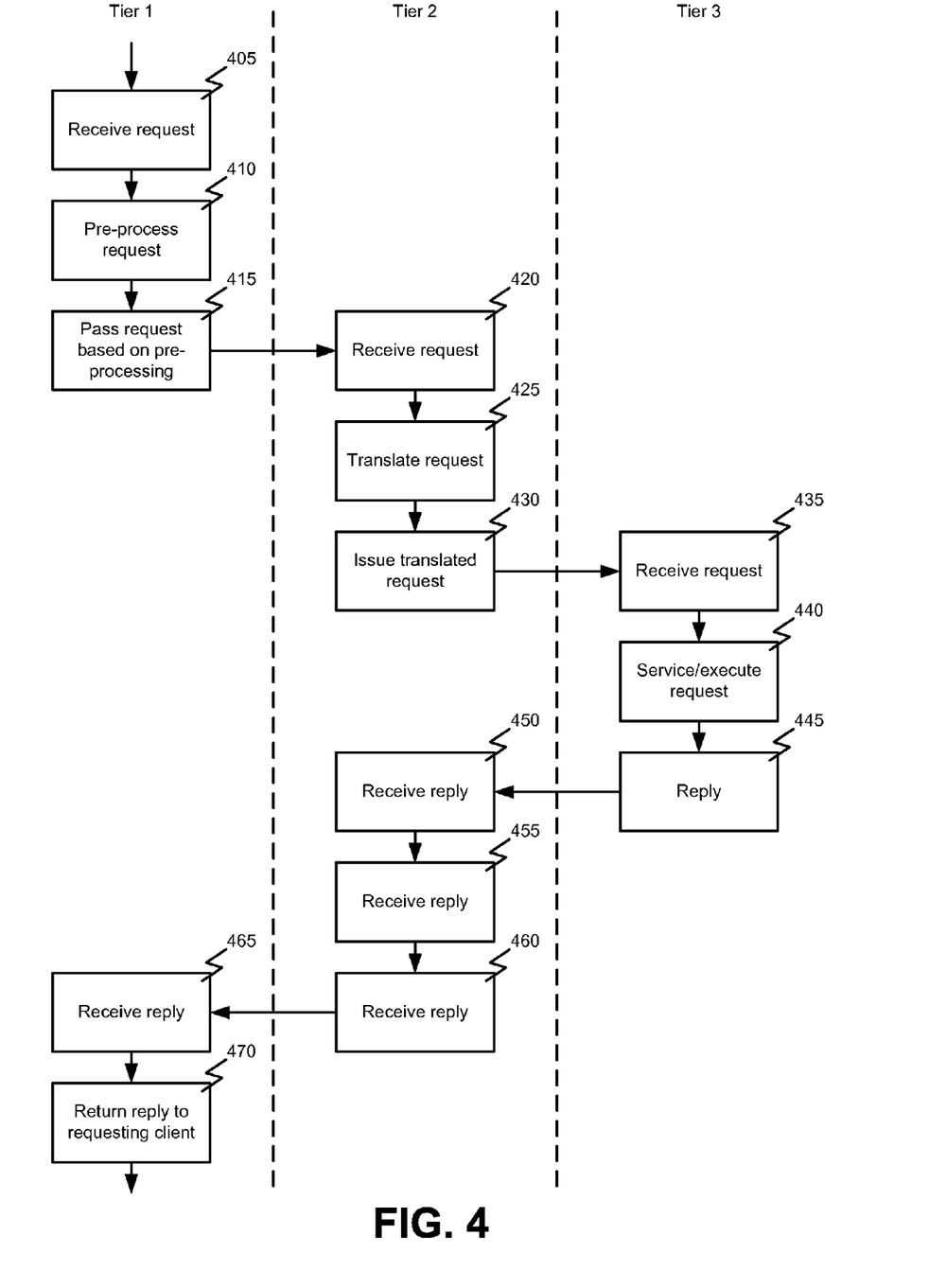
FIG. 4 is a flowchart illustrating a process for processing requests for information in a data repository according to one embodiment of the present invention.

FIG. 4 is a flowchart illustrating a process for processing requests for information in a data repository according to one embodiment of the present invention. In this example, processing begins with the first tier receiving 405 an XCAP request from a client. The first tier can pre-process 410 the XCAP request. As noted above, pre-processing 410 the XCAP request can comprise performing load balancing between the servers of the second tier, partitioning the request between the servers of the second tier, etc. The first tier can the forward 415 the XCAP request to the second tier based on the pre-processing. That is, the first tier can forward 415 or pass the request to a selected server or node of the second tier based on load balancing between the servers or nodes, partitioning between the servers or nodes, or based on other factors.

The second tier can receive 420 the XCAP request from the first tier and translate 425 the XCAP request to a database request. As noted above, translating 425 the XCAP request can comprise, for example, translating 425 the XCAP request to an SQL query or other request specific to the type of database of the third tier. The second tier can the forward 430 or pass the translated request to the third tier.

The third tier can receive 435 the database request from the second tier and service 440 the database request. The third tier can service 440 the database request by running the translated request, e.g., the SQL query or other database specific request, on the database to retrieve the requested information. Upon execution of the database request and retrieval of the requested information, the third tier can return 445 the retrieved information to the second tier.

The second tier can in turn receive 450 the retrieved data from the third tier. In some cases, the second tier may further translate 455 the information received from the third tier to an appropriate XCAP reply. That is, as noted above, the information maintained in the data repositories of the third tier may or may not be stored as XML documents. Thus, in the case that the information is not stored as XML documents, the second tier may translate 45 the information returned by the third tier to an XML format. The second tier can then forward 460 the retrieved, and possibly translated, information to the first tier. The first tier can receive 465 the reply from the second tier and in turn return 470 the reply to the requesting client.

Figure 5:
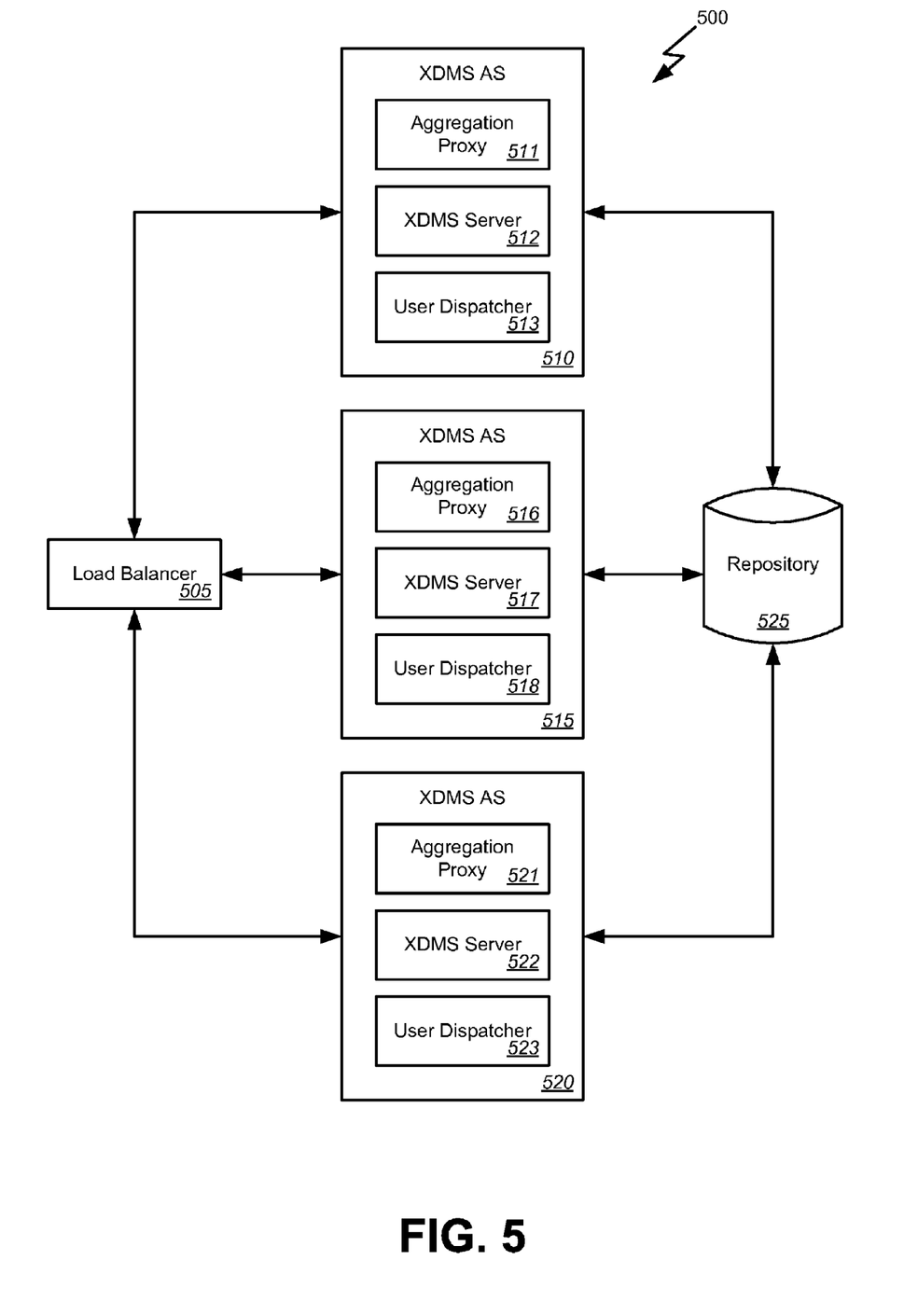
FIG. 5 is a block diagram illustrating additional details of an exemplary system for processing requests for information in a data repository according to one embodiment of the present invention.

FIG. 5 is a block diagram illustrating additional details of an exemplary system for processing requests for information in a data repository according to one embodiment of the present invention. In this example, the system 500 includes a load balancer 505, a set of application servers 510, 515, and 520 communicatively coupled with the load balancer 505, and a data repository 525 communicatively coupled with the application servers 510, 515, and 520. More specifically, the system 500 includes a back-end tier, i.e., a repository 525, as described above. As noted, the repository 525 can include the information, such as XML documents, that are the subject of requests from a client (not shown here). Generally speaking, the repository can receive, process, and respond to requests, e.g., SQL queries, for information received from the client via the application servers 510, 515, and 520 and load balancer 505 as will be described below.

The application servers 510, 515, and 520 can comprise a middleware or translation tier as described above. As noted, the application servers 510, 515, and 520 can be adapted to translate XCAP requests received from the via the load balancer 505 to database requests, such as SQL queries, appropriate to the repository 525 of the back-end tier. According to one embodiment, each application server 510, 515, and 520 can include and XDMS server 512, 517, and 522. Each XDMS server 512, 517, and 522 can be adapted to perform the translation of XCAP requests to a request appropriate to the repository 525. Additionally, each application server 510, 515, and 520 can include an aggregation proxy 511, 516, and 521. Each aggregation proxy 511, 516, and 521 can be adapted to perform aggregation of data for handling one or more requests and/or responses. The application servers 510, 515, and 520 can also include user dispatcher modules 513, 518, and 523. Each user dispatcher module can be adapted to handle dispatching of requests and/or responses from/to the client or clients.

The front-end tier, i.e., the load balancer 505, can be adapted to receive the XCAP requests from one or more clients and route or pass the requests to one or more of the application servers 510, 515, and 520. As noted above, the load balancer 505 can route requests to one or more of the application servers 510, 515, and 520 based on a current load of each of the application servers 510, 515, and 520, partitioning between the application servers 510, 515, and 520, or based on other factors. For example, the request can be passed to one or the application servers 510, 515, and 520 based on a current load of each of the application servers 510, 515, and 520, a current availability of each of the application servers 510, 515, and 520, etc. Additionally or alternatively, the XCAP request can be passed to one of the application servers 510, 515, and 520 based on partitioning between two or more of the application servers 510, 515, and 520. For example, partitioning can be based at least in part on an identity of a user associated with the XCAP request, a location of a user associated with the XCAP request, and/or other factors.

Stated another way, a system 500 for processing requests for information in a data repository 525 can comprise a load balancer 505 adapted to receive a request from a client, pre-process the request, and forward the request based on the pre-processing. A set of application servers 510, 515, and 520 can be communicatively coupled with the load balancer 505. The application servers 510, 515, and 520 can be adapted to receive the request from the load balancer 505, translate the request to a request appropriate to the repository 525 and forward the translated request to the data repository 525. A repository 525 can be communicatively coupled with the application servers 510, 515, and 520. The repository can be adapted to receive the translated request from the application servers 510, 515, and 520 and service the translated request.

In one implementation, the application servers 510, 515, and 520 can comprise a plurality of XDM servers 325 and 330 and the request from the client can comprise an XCAP request. The application servers 510, 515, and 520 may further comprise a plurality of clustered application servers such as a JGROUP or an Tangosol Coherence data grid. In such cases, pre-processing by the load balancer 505 can comprise performing load balancing between the application servers 510, 515, and 520 and forwarding the XCAP request based on the load balancing. The load balancing can be based on a current load of each of the plurality of application servers 510, 515, and 520, a current availability of each of the application servers 510, 515, and 520, etc. Additionally or alternatively, pre-processing the XCAP request by the load balancer 505 can comprise partitioning the XCAP request between two or more of the application servers 510, 515, and 520. Partitioning the XCAP request can be based at least in part on an identity of a user associated with the XCAP request, a location of a user associated with the XCAP request, and/or other factors.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for processing requests for information in a data repository, the system comprising:
    a first tier adapted to receive an eXtensible Markup Language (XML) Configuration Access Protocol (XCAP) request from a client, pre-process the request, and forward the XCAP request based on the pre-processing;
    a second tier communicatively coupled with the first tier, the second tier adapted to receive the XCAP request from the first tier, translate the XCAP request to a database request, and forward the database request; and
    a third tier communicatively coupled with the second tier, the third tier adapted to receive the database request from the second tier and service the database request.

2. The system of claim 1, wherein the second tier comprises a plurality of XML Document Management (XDM) servers.

3. The system of claim 2, wherein the plurality of XDM servers comprises a plurality of web servers.

4. The system of claim 3, wherein the plurality of web servers comprises a plurality of clustered application servers.

5. The system of claim 4, wherein the plurality of clustered application servers comprises a JGROUP.

6. The system of claim 4, wherein the plurality of clustered application servers comprises a Tangosol Coherence data grid.

7. The system of claim 2, wherein pre-processing comprises performing load balancing between the XDM servers.

8. The system of claim 7, wherein forwarding the XCAP request based on the pre-processing comprises forwarding the XCAP request to one of the XDM servers based on the load balancing.

9. The system of claim 7, wherein load balancing is based on a current load of each of the plurality of XDM servers.

10. The system of claim 7, wherein load balancing is based on a current availability of each of the plurality of XDM servers.

11. The system of claim 2, wherein pre-processing the XCAP request comprises partitioning the XCAP request between two or more of the XDM servers.

12. The system of claim 11, wherein partitioning the XCAP request is based at least in part on an identity of a user associated with the XCAP request.

13. The system of claim 11, wherein partitioning the XCAP request is based at least in part on a location of a user associated with the XCAP request.

14. The system of claim 1, wherein the third tier comprises a database management system.

15. The system of claim 14, wherein the database request comprises an SQL query.

16. The system of claim 15, wherein the third tier services the database request by running the SQL query on the database.

17. The system of claim 14, wherein the database management system is adapted to perform local caching.

18. The system of claim 14, wherein the database management system is adapted to provide local persistence.

19. A method of processing requests for information in a data repository, the method comprising:
   receiving an eXtensible Markup Language (XML) Configuration Access Protocol (XCAP) request from a client;
   translating the XCAP request to a database request; and
   accessing the information in the data repository based on the database request.

20. The method of claim 19, further comprising, prior to translating the XCAP request to a database request, pre-processing the XCAP request.

21. The method of claim 20, wherein pre-processing the XCAP request comprises performing load balancing between a plurality of XDM servers.

22. The method of claim 21, wherein forwarding the XCAP request based on the pre-processing comprises forwarding the XCAP request to one of the XDM servers based on the load balancing.

23. The method of claim 21, wherein load balancing is based on a current load of each of the plurality of XDM servers.

24. The method of claim 21, wherein load balancing is based on a current availability of each of the plurality of XDM servers.

25. The method of claim 20, wherein pre-processing the XCAP request comprises partitioning the XCAP request between two or more of a plurality of XDM servers.

26. The method of claim 25, wherein partitioning the XCAP request is based at least in part on an identity of a user associated with the XCAP request.

27. The method of claim 25, wherein partitioning the XCAP request is based at least in part on a location of a user associated with the XCAP request.

28. The method of claim 19, wherein the data repository comprises a database management system.

29. The method of claim 28, wherein the database request comprises an SQL query.

30. The method of claim 29, wherein accessing the information in the data repository based on the database request comprises running the SQL query on the database.

31. A machine-readable medium having stored thereon a series of instructions which, when executed by the processor, cause the processor to process requests for information in a data repository by:
   receiving an eXtensible Markup Language (XML) Configuration Access Protocol (XCAP) request from a client;
   translating the XCAP request to a database request; and
   accessing the information in the data repository based on the database request.

32. The machine-readable medium of claim 30, further comprising, prior to translating the XCAP request to a database request, pre-processing the XCAP request.

33. The machine-readable medium of claim 32, wherein pre-processing the XCAP request comprises performing load balancing between a plurality of XDM servers.

34. The machine-readable medium of claim 33, wherein forwarding the XCAP request based on the pre-processing comprises forwarding the XCAP request to one of the XDM servers based on the load balancing.

35. The machine-readable medium of claim 32, wherein pre-processing the XCAP request comprises partitioning the XCAP request between two or more of a plurality of XDM servers.

36. The machine-readable medium of claim 31, wherein the data repository comprises a database management system.

37. The machine-readable medium of claim 36, wherein the database request comprises an SQL query.

38. The machine-readable medium of claim 37, wherein accessing the information in the data repository based on the database request comprises running the SQL query on the database.

39. A system for processing requests for information in a data repository, the system comprising:
   a first tier adapted to receive a request from a client, pre-process the request, and forward the request based on the pre-processing;
   a second tier communicatively coupled with the first tier, the second tier adapted to receive the request from the first tier, translate the request, and forward the translated request; and
   a third tier communicatively coupled with the second tier, the third tier comprising a data repository and wherein the third tier is adapted to receive the translated request from the second tier and service the translated request from the data repository.

40. The system of claim 39, wherein the request from the client comprises an eXtensible Markup Language (XML) Configuration Access Protocol (XCAP) request.

41. The system of claim 40, wherein the second tier comprises a plurality of XML Document Management (XDM) servers.

42. The system of claim 41, wherein the data repository of the third tier comprises a database.

43. The system of claim 42, wherein the XDM servers are adapted to translate the XCAP request to a database request.

* * * * *